April 18, 1967 T. W. MULLEN 3,314,275
TOOLING FOR SHEET MATERIAL FORMING
Filed Dec. 17, 1963 7 Sheets-Sheet 1

INVENTOR.
Thomas H. Mullen

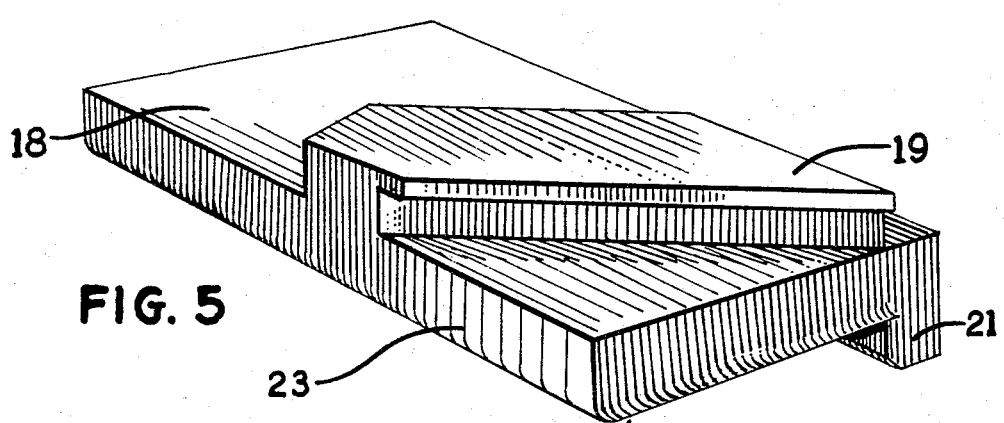
FIG. 5
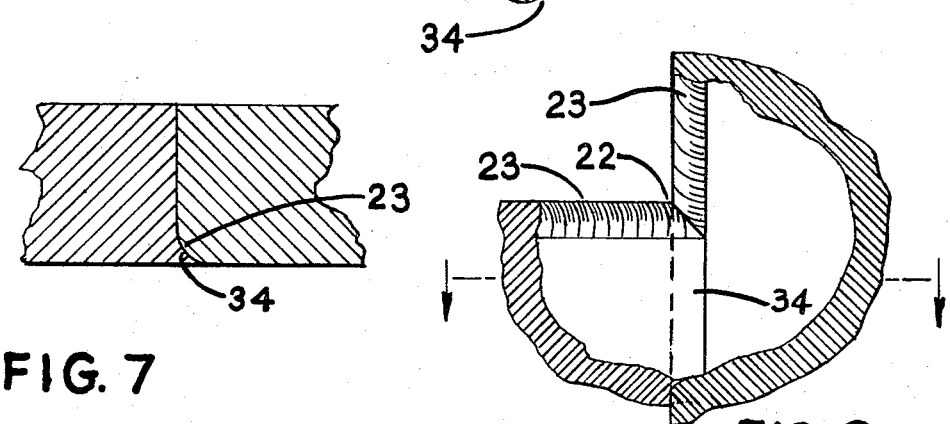
FIG. 7
FIG. 8
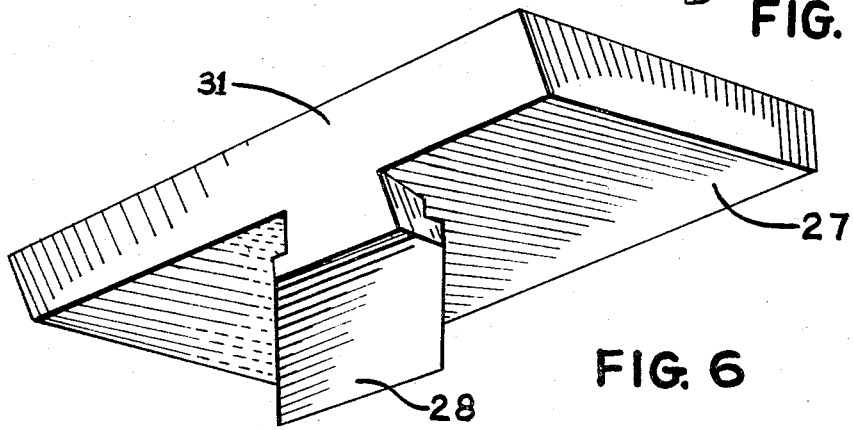
FIG. 6

United States Patent Office 3,314,275
Patented Apr. 18, 1967

3,314,275
TOOLING FOR SHEET MATERIAL FORMING
Thomas W. Mullen, Evansville, Ind., Mary E. Mullen, 2013 W. Iowa St., P.O. Box 6001, Sta. B, Evansville, Ind. 47712, executrix of said Thomas W. Mullen, deceased
Filed Dec. 17, 1963, Ser. No. 331,289
11 Claims. (Cl. 72—350)

My invention relates to draw forming of sheet material into the various shell shapes. I produce radial or diametrical stretching forces in a sheet blank prior to and throughout a draw operation. Simultaneously with the production of such stretch forces, I massage or iron the sheet in one direction on one surface, and in another direction on the other surface during the draw operation. Utilizing this invention, I am the first to draw a rectangular shell having sharp corners. Similarly, I am the first to draw from sheet blank in one press stroke a shell of pyramidal section with sharp corners, or even with corners of small radii.

It is well known by those skilled in the art of sheet metal forming that power press tools for the purpose of forming deeply drawn stampings employ four basic components. One component is variously referred to as a punch, male die, or a form post. A second component is variously referred to as a die, die ring, draw ring, or a die block. The third component is variously referred to as a pad, a blank holder, a pressure block, or a pressure ring. The fourth component is a kicker or an ejector to disengage the formed shell.

The die block and pressure ring are movable toward and away fro meach other. The die block and pressure ring together are movable relative to the form post. In one well-known arrangement, the form post is mounted on the press bed or lower platen. The pressure ring surrounds the form post at the upper end thereof, and is supported upon a suitable pressure pad or cushion as by pins projecting upwardly through the press bed or platen. The die ring is mounted on the upper press platen directly above and in line with the form post and pressure ring.

A blank of a sheet material is placed on the pressure ring where it overlies the form post. The press is then actuated to bring down the die to first engage the blank between the die block and the pressure ring, and then carry the blank downward over the form post.

In producing round or cylindrical shapes with the above tooling, the practical height of the shell obtained by one draw is dependent upon the ratio of height to diameter of the shell, and the corner radius. As the radius decreases, the depth of the draw decreases. The same is true to an even greater degree when drawing rectangular shapes. In rectangular drawing, the number of draws required depends upon the ratio of the corner radius to the height of the draw.

It is an object of my invention, therefore, to draw sheet material into shell forms having depths not limited by radii.

It is another object of my invention to make rectangular and other many sided drawings with sharp corners in one draw.

It is a further object of my invention to form sheet material into a pyramidal section having sharp corners in one draw.

A still further object of my invention is to produce in a single draw shapes now requiring several draws.

Another object of my invention is to produce deep drawn shapes with a minimum of trim material or waste.

Other objects and the many advantages of my invention will be understood by those skilled in the art from the following description taken in connection with the accompanying drawings in which:

FIG. 5 is a perspective showing the T-keyed side of a draw ring slide plate.

FIG. 6 is a perspective showing the T-keyed side of a pressure ring slide plate.

FIG. 7 is a broken away sectional view looking in the direction of the arrows, FIG. 8, showing the engagement of a draw ring slide plate end with the side of a draw ring slide plate.

FIG. 8 is a broken away plan view looking in the direction of arrow 15, FIG. 1, showing the miter-like juncture formed as the radiused or working edge of a draw ring slide plate forms a corner at its lipped end and engages the radiused or working edge of another draw ring slide plate.

Figure 1:
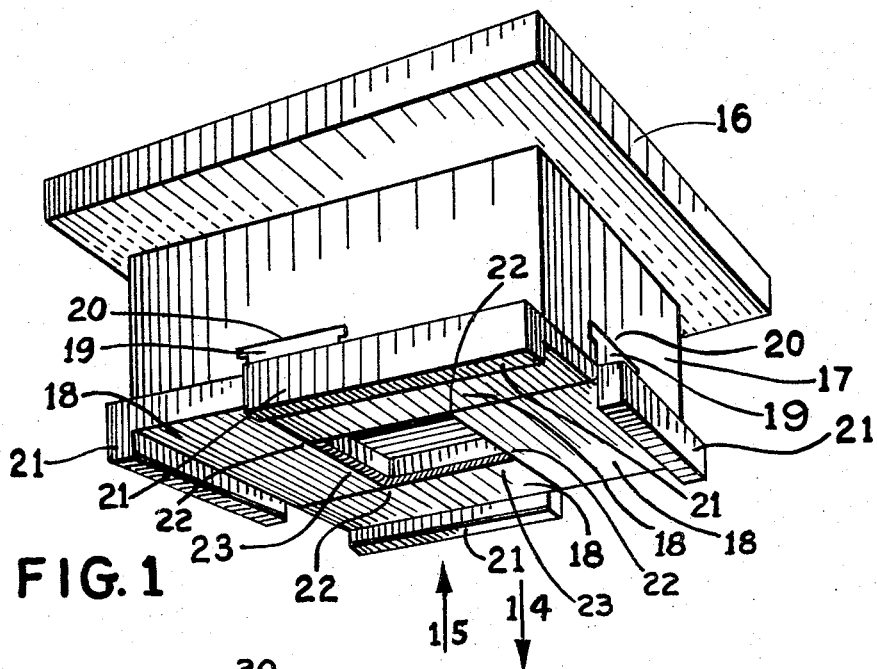
FIG. 1 is a perspective showing expandable draw ring slide plates in assembly with a die block which is attached to an upper power press platen.
Figure 2:
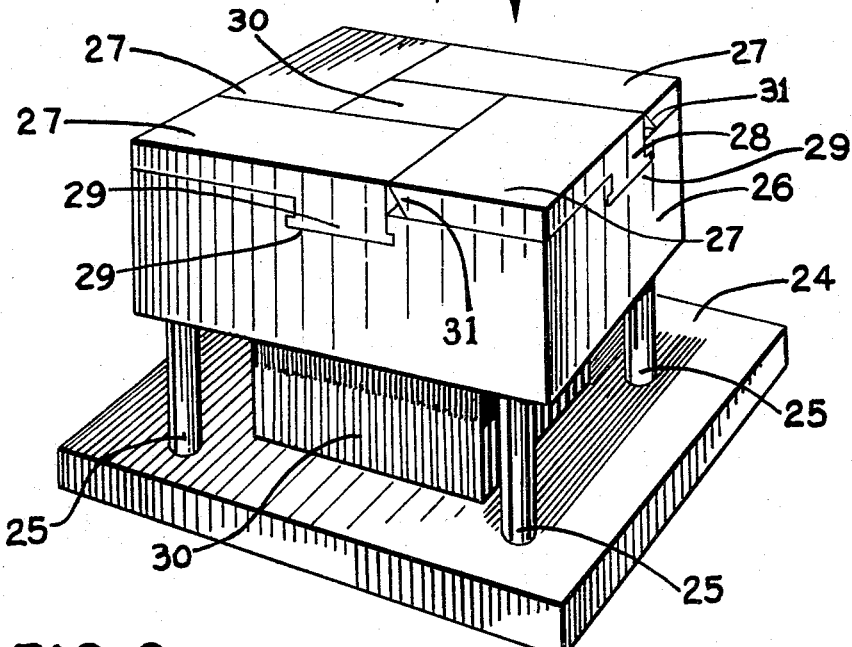
FIG. 2 is a perspective showing expandable pressure ring slide plates carried by a cushion supported pressure ring carrier block assembled about a form post which is attached to a power press lower platen.
Figure 3:
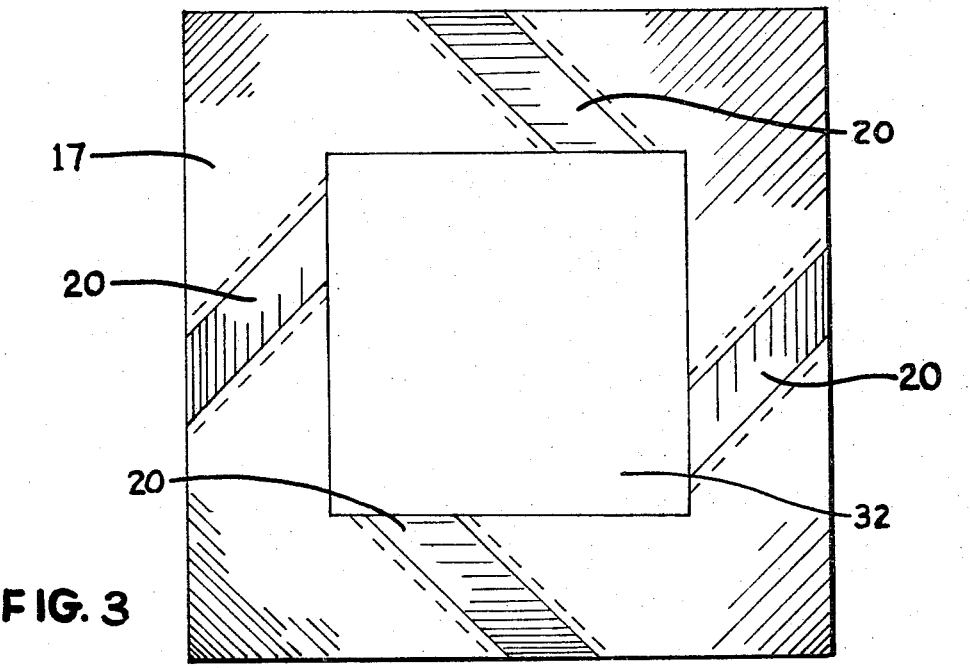
FIG. 3 is a plan view looking in the direction of arrow 15, FIG. 1, at the working side of the die block with its draw ring slide plates removed to show the arrangement of four T-keyways.

With reference to FIG. 1 of the accompanying drawings, a combination dieblock and draw ring carrier 17 is secured to an upper press platen 16. This die block and draw ring carrier 17 is equipped with a form post receiving bore 32 as best seen in FIG. 3 and four T-keyways 20 seen in FIG. 1 and FIG. 3. Each keyway 20 has slideably engaged therein a T-key 19 of a draw ring slide plate 18 seen in FIGS. 1 and 5. Such assembly of draw ring slide plates 18 produces in perfect effect an expandable draw ring. FIG. 2 shows a punch or form post 30 mounted on a lower press platen 24 with the form post having slideably engaged therearound a pressure ring carrier block positioned by pins 25 bearing against the head of a yieldable cushion ram 37.

Figure 4:
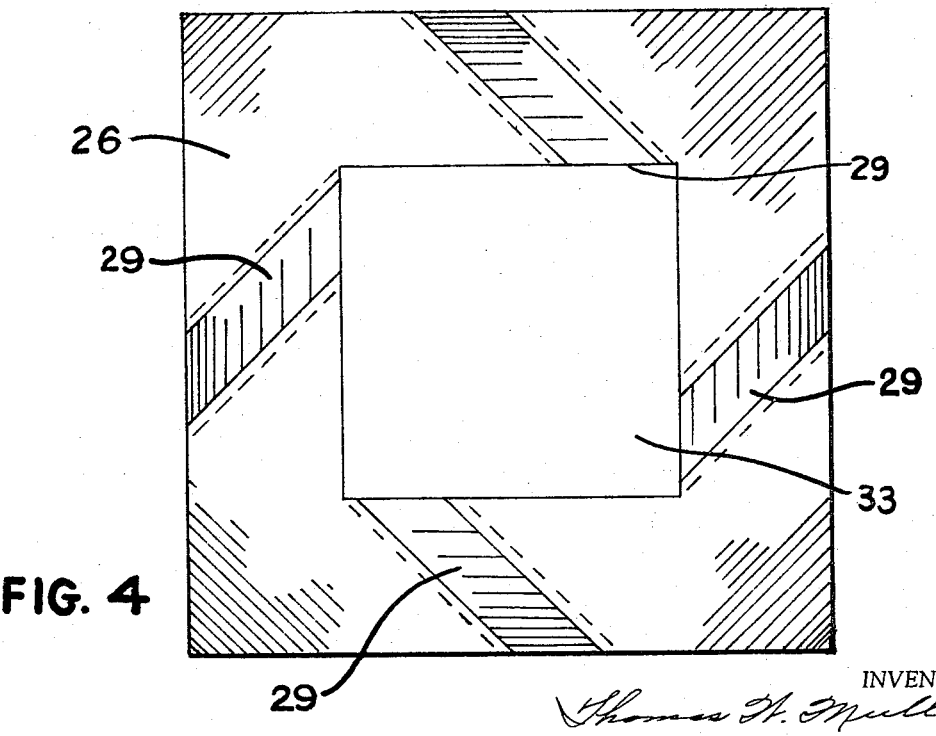
FIG. 4 is a plan view looking in the direction of arrow 14, FIG. 2, at the working side of the pressure ring carrier block with the pressure ring slide plates removed to show the arrangement of four T-keyways.

Assembled on the pressure ring carrier block 26 are four pressure ring slide plates 27, each with a T-key 28 engaged in a T-keyway 29, also seen in FIGS. 4 and 6. This arrangement, like that of the draw ring slide plates 18 in FIG. 1, produces an expandable pressure ring. The keyways 20 and 29 arranged at angles of 90 degrees to each other and cut into the working face of each carrier block 17 and 26 at angles of 45 degrees produces a 90 degree opposed relation of the keyways 20 to those 29 in the assembled blocks 17 and 26. This opposed directional relation of the keyways 20 to the keyways 29 is important in accomplishing some new and useful functions of my invention.

FIGS. 5, 7, and 8, show several important details of a draw ring slide plate 18. An overlapping lip 34 is so formed on the end of a working surface of a draw ring slide plate 18 that it will slideably fit and overlap a curved or radiused working edge 23 of another draw ring slide plate 18. This arrangement produces a miter-like juncture 22 shown in FIG. 8. T-key 19 is located at 45 degrees across plate 18.

Figure 11:
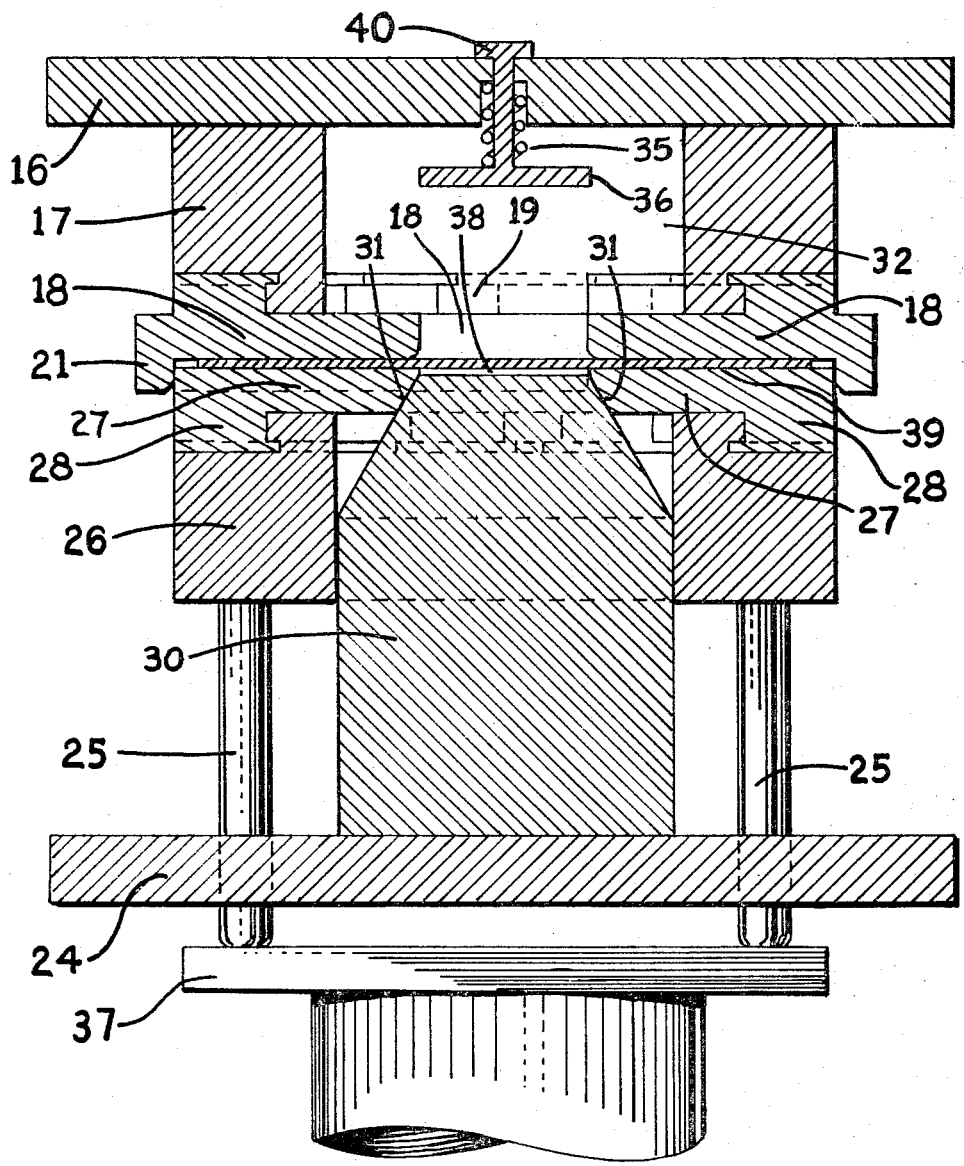
FIG. 11 is a vertical sectional view, combining FIG. 9 and FIG. 10, showing the initial engagement of a blank of to-be-formed sheet material between the draw ring of FIG. 9 and the pressure ring of FIG. 10.
Figure 12:
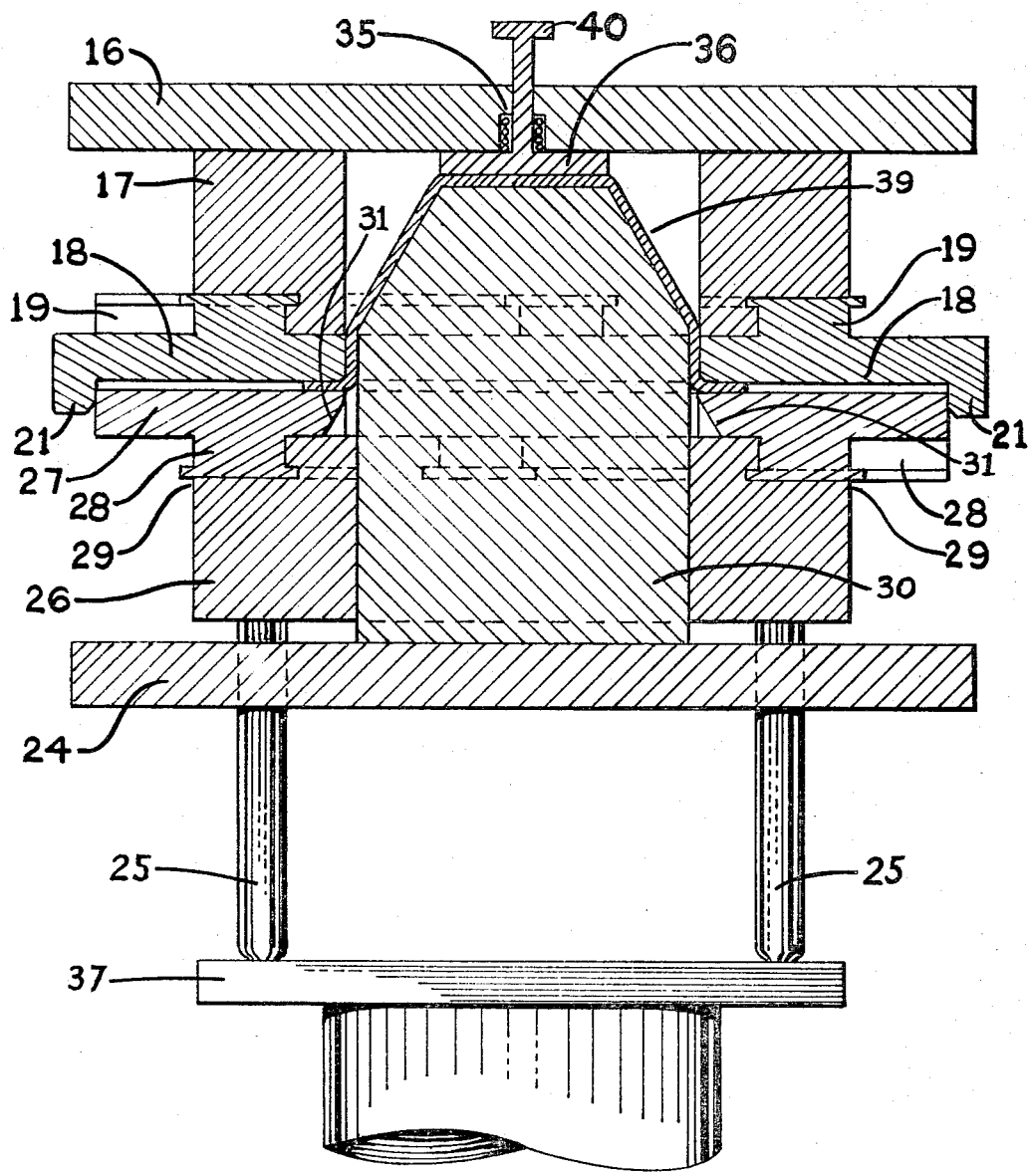
FIG. 12 is a vertical center sectional view, parallel o either of the vertical sides of FIG. 1 and FIG. 2, showing a completely formed stamping covering the form post 30, FIG. 2, and engaged therearound by the completely expanded draw ring 18, FIG. 1, which bears a small margin of the blank material against the completely expanded pressure ring's working surface nearest the form post.

An angle portion forming a ledge 21 on each draw ring slide plate 18 slideably engages the outside edge of each pressure ring slide plate 27, as seen in FIGS. 11 and 12, so that outward movement of a pressure ring slide plate will cause the said draw ring slide plate 27 to be driven outward also.

Figure 9:
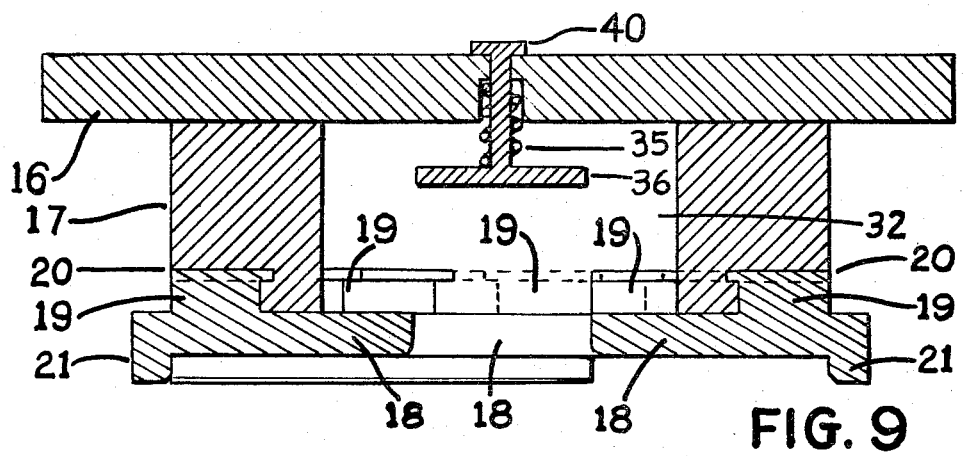
FIG. 9 is a vertical center section parallel to either of the two vertical sides of FIG. 1.
Figure 10:
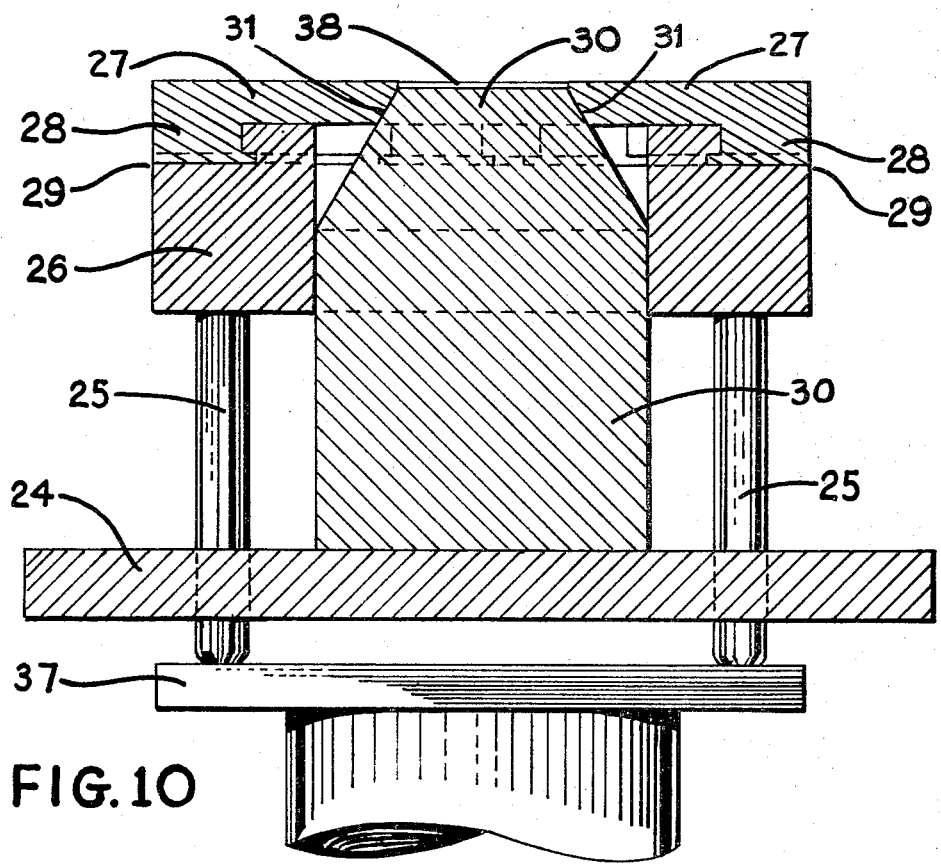
FIG. 10 is a vertical center section parallel to either of the two vertical sides of FIG. 2.

FIG. 6 shows a form post 30 engaging edge 31, of a pressure ring slide plate 27 and FIGS. 9, 10, and 11 show the engagement thereof with the punch or form post 30. The T-key 28 is arranged as an integral part to cross the pressure ring carrier block 26 engaging side of a pressure ring slide plate 27, at an angle of 45 degrees.

It should be clear at this point that I have devised a new and novel expandable draw ring comprised of slide plates as well as carrier means for supporting same in the form of a die block equipper with T-keyways, and also that I have devised a new and novel co-acting pressure ring comprised of slide plates along with a pressure ring carrier block equipped with T-keyways. To explain the operation and functions of this invention I shall refer principally to the sectional views of the drawings, FIGS. 9, 10, 11, and 12.

FIG. 9 shows the die block draw ring assembly positioned above the punch or form post 30 and pressure ring assembly in FIG. 10. The die block is attached to a platen 16 of a suitable press and the form post is mounted on the opposed platen 24 of the same press. Cushion pins 25 project through suitable holes in press platen 24 to engagement with the head 37 of a yieldable cushion ram 37. In FIGS. 9, 10, 11, and 12 a stamping ejection means comprises a flat headed bolt 40 passing through platen 16 and secured to a flat plate 36 with a coil spring 35 surrounding the bolt 40 between the plate 36 and the platen 16.

A space 38 shown in FIGS. 10 and 11 is formed by supporting the working face of the pressure ring assembly 27 a distance above the working end of the form post 30. This space is provided to produce pressure ring and draw ring expansion before the working surface of the pressure ring 27 under vertical movement reaches a level with the working end of the form post 30.

Figure 13:
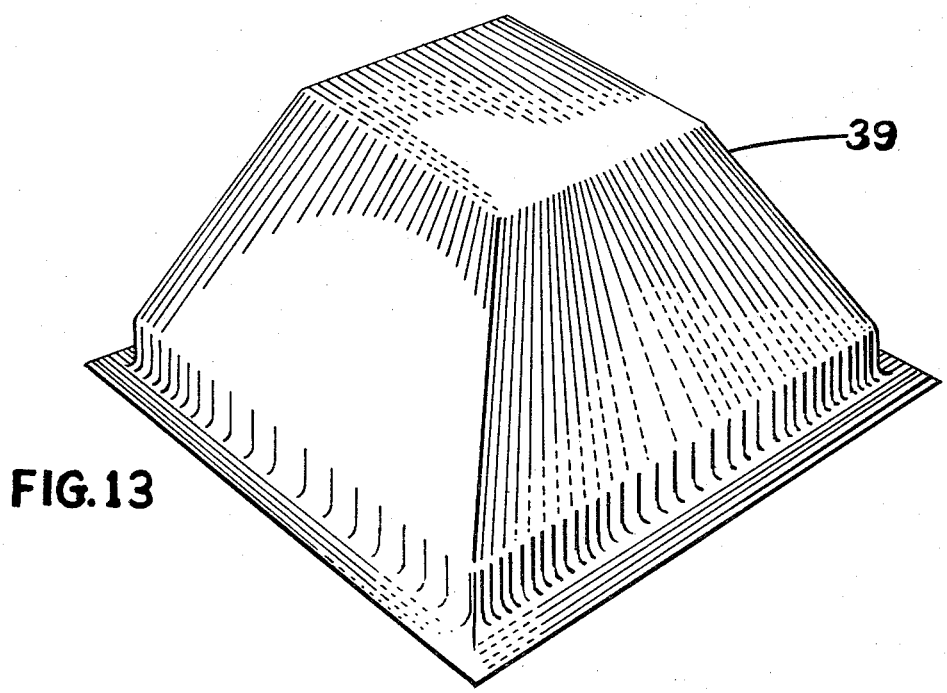
FIG. 13 is a perspective of an example stamping as the sectional view in FIG. 12 indicates.

In operation, a blank of sheet material 39, seen in FIG. 11, is centered over the form post 30 and pressure ring assembly 27, while the draw and pressure ring assemblies 18 and 27 are spaced apart as in FIGS. 9 and 10. Press actuation first causes the blank to be engaged between the draw ring plates 18 and pressure ring plates 27, and then to be drawn downward to the finished form 39 as seen in FIGS. 12 and 13.

During the press actuation, continued draw ring pressure on the blank 39 forced the latter to force the pressure ring assembly 27 down the sides of the form post 30, causing lateral expansion of the pressure ring assembly 27 which by its outer edges engaged the angle portions 21 of assembly 18 into an equal lateral expansion.

At the very beginning of the press actuation, as the draw and pressure rings forcefully grip the blank therebetween, a co-acting lateral expansion of the two causes a diametrical as well as a circumferential stressing of the blank, thereby utilizing a great amount of the blank's inherent elasticity as an important aid in forming it over the sharp cornered form post. The action producing diametrical stressing is easily understood by observing the drawings. The circumferential stressing is induced by the traction on the opposed sides of the blank as the draw and pressure rings expand radially and at the same time move in opposed parallel directions. The very beginning forces acting on the blank capture a great amount of its elasticity out in its peripheral margin which acts as a gathering force as drawing proceeds down along the form post. These actions have made possible the deep drawing of many different kinds and thicknesses of metals and other materials with the same tools.

A perfect ironing effect takes place as the radiused working edge of the draw ring forcefully engages the blank against the form post. The force of this ironing effect is regulatable by the distance employed across a working face of a pressure ring slide plate between its working edge and its driver ledge. This ironing effect reduces to a minimum the necessity of marginal flange holding material such as is commonly trimmed away from stampings made by ordinary procedures.

Any material under stress or a stretched condition within its elastic limits is inherently ready to re-gather and snap back to its normal shape but when ironed or flattened under stress as against a form post and there relieved of further stress it readily takes a new shape which it easily maintains.

It is apparent by the foregoing that I have achieved by new means the new functions of pre-stressing and the maintenance of continuous stressing of flat materials throughout the period of their being formed into shell shapes.

While one embodiment of the invention is herein illustrated and described, it will be understood that many modifications may be made within the spirit and scope of the invention as set forth in the following claims.

What is claimed is:

1. Tooling for forming sheet material into a shell comprising:
   (a) a form post;
   (b) a centrally apertured die ring;
   (c) a centrally apertured pressure ring;
   (d) said rings having opposed faces to engage the opposite surfaces of and clamp therebetween a sheet of such material;
   (e) means mounting said rings in axial alignment for relative axial movement to clamp such a sheet;
   (f) means mounting said rings and said post in axial alignment and for relative axial movement between said post and said rings to cause said post to pass through the central apertures of said rings;
   (g) at least one of said rings comprising a base member and a plurality of segments mounted for movement on said base member in paths about said post and in nonintersecting relation to the axis of said one ring, said segments having surfaces which in the aggregate define the entire one of said opposed faces of said one ring; and
   (h) means for imparting movement to said segments along said paths concomitant with movement of said post relative to said rings.

2. The tooling defined in claim 1 wherein said opposed faces are planar and are normal to the common axis of said post, block and ring.

3. The tooling defined in claim 1 wherein said paths of said segments are rectilinear.

4. The tooling defined in claim 3 wherein the centerlines of said paths of said segments are tangent to a common circle concentric with the axis of said one ring.

5. The tooling defined in claim 4 wherein there are four such segments on said one ring and the path of each segment is perpendicular to the path of movement of each circumferentially adjacent segment.

6. The tooling defined in claim 3 wherein said post and the central aperture of said rings are polygonal in cross-section normal to the common axis thereof.

7. The tooling defined in claim 6 wherein said one ring is said die ring and wherein the junctures of the surfaces of said segments defining the central aperture of said die ring with the surfaces of said segments defining said opposed face of said die ring are small radius arcuate surfaces, each of said arcuate surfaces intersecting the arcuate surface of the circumferentially adjacent segments in a sharply defined line throughout the limits of travel of said segments along their paths.

8. The tooling defined in claim 1 wherein the other of said rings comprises a second base member and a second plurality of segments mounted for movement on said second base member in paths normal to the axis of said other ring and having surfaces together defining the entire one of said opposed faces of said other ring.

9. The tooling defined in claim 8 wherein the paths of movement of said segments are rectilinear and the centerlines of such paths of the segments of each of said rings are tangent to a common circle concentric with the axis of such ring.

10. The tooling defined in claim 9 wherein the circumferential components of the motions of the segments on said one ring are oppositely directed with respect to the circumferential components of the motions of the segments on said other ring.

11. The tooling defined in claim 10 wherein means are provided interconnecting each segment of said one ring with one of the segments of the other ring to impart concomitant movement thereto.

References Cited by the Examiner

UNITED STATES PATENTS

| 531,337 | 12/1894 | Saltzkorn et al. | 72—350 |
| 851,630 | 4/1907 | Sloman | 72—350 |
| 2,030,484 | 2/1936 | Waller | 72—348 |
| 3,037,473 | 6/1962 | Whistler et al. | 72—350 |

CHARLES W. LANHAM, *Primary Examiner.*
RICHARD J. HERBST, *Examiner.*